United States Patent

[11] 3,598,913

[72] Inventor Peter Johannes Hubertus Janssen
Emmasingel, Eindhoven, Netherlands
[21] Appl. No. 784,629
[22] Filed Dec. 18, 1968
[45] Patented Aug. 10, 1971
[73] Assignee U.S. Philips Corporation
New York, N.Y.

[54] TELEVISION RECEIVER
4 Claims, 3 Drawing Figs.

[52] U.S. Cl. .......... 178/7.5 DC
[51] Int. Cl. .......... H04n 5/16
[50] Field of Search .......... 178/7.5 DC, 7.3 DC

[56] References Cited

UNITED STATES PATENTS 2,832,822 4/1958 Rogers .......... 178/7.5 (DC)

*Primary Examiner*—Richard Murray
*Attorney*—Frank R. Trifari

ABSTRACT: This invention relates to a control circuit for a television receiver which features a gated circuit which passes the flyback signal a different selected amount than the video intensity signal. Therefore, the ratio of the flyback signal to that of intensity signal is controllable. The flyback signal is used to control the beam current intensity by use of a rectifier circuit.

INVENTOR.
PETER J. H. JANSSEN
BY
AGENT

INVENTOR.
PETER J. H. JANSSEN
BY Frank R. Trifari
AGENT

TELEVISION RECEIVER

The invention relates to a television receiver for displaying a video signal on a picture display tube which video signal to be displayed comprises a picture signal derived from a video signal received by the receiver and a first reference signal independent of the nature of the picture signal. The first reference signal is coupled to partially control an electron beam of the picture display tube. The amplitude ratio between the first reference signal and the picture signal in the video signal to be displayed being adjustable with the aid of a brightness control device, and the video signal received by the receiver comprising a second reference signal.

A television receiver of the kind described above is known from U.S. Pat. No. 2,965,705 in which a first reference signal which is adjustable in amplitude is added to the video signal during the line-blanking time.

With the aid of said added first reference signal the extent of control of three electron beams in the display tube is coupled to the first reference signal in a predetermined mutual ratio during the occurrence of this reference signal. The three electron beams are then always influenced by the video signal, and hence by the first reference signal, in the ratio desired for a satisfactory color display. The color balance of such a television receiver is therefore in principle invariably maintained when adjusting the ratio of the amplitude of the first reference signal relative to the amplitude of the picture signal, that is to say, when adjusting the luminance.

A drawback of the above-mentioned known television receiver is, however, that when changing the amplitude of the picture signal, for example, in case of contrast control, the amplitude of the first reference signal remains constant, so that in case of weak picture signals one gets a picture impression which is different from that with strong signals. In case of a low-adjusted brightness for the first reference signal only the brightest portions of the picture remain visible when decreasing the amplitude of the picture signal and hence of the contrast; whereas in case of a high-adjusted brightness of the first reference signal the contrast decreases more strongly when decreasing the amplitude of the picture signal, than might be expected due to the decreased picture signal, which has a very disturbing effect.

A satisfactory contrast control is then difficult to obtain, especially for a color television receiver. For an amplitude variation in the luminance of the picture-producing signal as is required for such contrast control, the viewer gets the impression that with a low-adjusted brightness of the first reference signal at an amplitude decrease of the picture signal the saturation of the colors in the displayed picture increases too strongly; whereas with a high-adjusted brightness of the first reference signal one gets the impression that said saturation on the contrary decreases too strongly.

An object of the invention is to obviate these drawbacks and is based on the recognition of the fact that with a satisfactory contrast control the level of the first reference signal must also be controlled.

A television receiver according to the invention of the kind described in the preamble is characterized in that the brightness control device comprises an electric transmission circuit from the output of which the said video signal to be displayed is derived and to the input of which the video signal received by the receiver is applied. In the received video signal a level at the said input corresponding to a certain picture brightness is independent of the nature of the picture signal and the second reference signal has a level differing from zero. The extend of transmission from the input to the output of the transmission circuit being time-dependent such that the ratio between the transmission of the second into the first reference signal for at least part of the period of occurrence of said reference signals and the transmission during the occurrence of the picture signal is adjustable.

The ratio between the picture brightness and the reference brightness, that is to say, the brightness of the reference signal is then substantially not influenced in case of amplitude variation of the video signal so that a correct picture display both for black and white and for color pictures is obtained for each amplitude of the video signal to be displayed.

Where reference is made to the brightness of the reference signal in the picture displayed, the brightness is meant which this reference signal might produce on the picture display tube if the circumstances at the picture display tube would then be similar to those during the display of the picture signal. Actually said signal mostly falls within the line fly-back time and is usually not visibly displayed.

In a further elaboration of a color television receiver according to the invention in which the transmission circuit comprises an active element through which the video signal is passed, the ratio of the amplification of said active element for at least part of the period of occurrence of said reference signal is adjustable relative to the amplification of said active element during the occurrence of the picture signal. In an advantageous embodiment the said active element is present in an IF-amplifier through which a received signal at least modulated by the video signal is passed and a pulse voltage or pulse current adjustable in amplitude is superimposed on an adjusting voltage or adjusting current.

In fact, the levels of the signals in the modulated signal are still present in the ratios received by the receiver so that it is not necessary to first bring the reference signal on a level which differs from zero and is independent of the nature of the picture signal. Furthermore, it is not necessary to sue a switching device for various transmissions in the transmission circuit.

The so-called setup in the received signal, that is to say, the difference between the black level of the picture signal and the black level of the second reference signal in the video signal can be corrected in a simple manner with the aid of the last-mentioned brightness control. Said correction being furthermore independent of any amplitude variations in the received signal or any variation in the adjustment of the picture contrast. The picture brightness need not be readjusted in case of such variations.

The very accurate brightness control according to the invention shows to special advantage in a preferred embodiment of a television receiver according to the invention which includes a device for keeping constant a beam current control of the display tube produced by the reference signal and measured during the occurrence of the first reference signal on the display tube. In fact, the beam current is the only value which is a direct measure of the picture brightness; a possible adjusting voltage is not. Said embodiment also offers the possibility to adjust the brightness of the picture displayed in case of beam-current stabilization in such manner that the black portions in the picture are at a brightness level which is lower than that of the reference signal.

Particularly in color television receivers in which a few electron beams are automatically adjusted in brightness simultaneously by variation of the amplitude of the reference signal and in which this adjustment according to the invention is thus independent of the amplitude of the received signal or of the picture contrast adjustment, an elegant brightness adjustment is obtained which, particularly with reference to the current stabilization of the beams, ensures an excellent color balance in the picture displayed, in the latter case even independent of, for example, supply voltage variations at the picture display tube.

In order that the invention may be readily carried into effect, it will now be described in detail by way of example with reference to the accompanying diagrammatic drawings in which.

Figure 1:
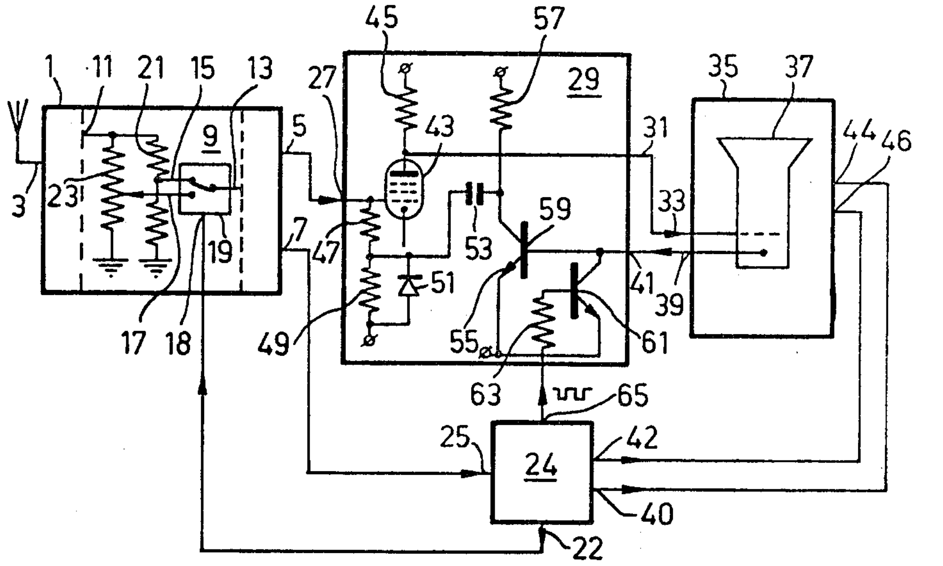
FIG. 1 shows a television receiver according to the invention having a brightness control device in which the transmission of a transmission circuit is switched every time with the aid of a switching control of the display tube is coupled to the first reference signal with the aid of a beam-current stabilization device.

In FIG. 1, in which for the sake of clarity the portions which are not important for the understanding of the invention have been omitted, the television receiver comprises a section 1 having an input 3 for supplying a received signal to be handled. Such a signal comprises a video signal including, as is apparent from FIG. 3, a picture signal occurring during the so-called sweep $T_1$ and at least a reference signal called hereinafter the second reference signal occurring, for example, during the fly-back time $T_2$. The second reference signal is a standard signal corresponding to a certain standard brightness level in the picture signal. As a rule said standard brightness level is the black level. The section 1 furthermore has two outputs 5 and 7 and a brightness control device 9 having an input 11 and an output 13. The input 11 is connected to two inputs 15 and 17 of an electronic switch 19 along two signal paths having different transmission factors. Said two signal paths are formed by a potentiometer circuit 21 and a potentiometer circuit 23. An input 18 of the switch 19 is furthermore connected to an output 22 of a time-base device 24 for obtaining an operation signal therefrom. The brightness control device 9 thus forms a transmission circuit having a time-dependent transmission. An input 25 of the time-base device 24 is connected to the output 7 of the section 1 to which output 7 synchronization signals appear when receiving a signal at the input 3 of the receiver. The output 5 of the section 1 is connected to input 27 of a beam-current stabilization device 29. When receiving a signal at the input 3 of the receiver a video signal obtained by detection appears at the output 5 which video signal includes the picture signal during a period $T_1$ and a first reference signal during a period $T_2$. Said first reference signal is distinct from the second reference signal due to the transmission through the brightness control device 9. The beam-current stabilization device 29 has an output 31 which is connected to an input 33 of a picture reference section 35 for applying the video signal thereto. In the last-mentioned video signal the first the displayed signal is coupled, with the aid of the beam-current stabilization device 29, to partially control an electron beam of a saturation display tube 37 present in the picture display section 35.

The picture display section 35 furthermore has an output 39 for supplying the beam-current from the picture tube 37 to an input 41 of the beam-current stabilization device 29. The picture display section 35 furthermore has two inputs 44 and 46 which are connected to outputs 40 and 42 of the time-base device 24 for supplying deflection currents for the picture display tube to the picture display section 35. The beam-current stabilization device 29 includes a tube 43 serving as an amplifier for amplification of the video signal applied to the input 27. The output 31 of the beam-current stabilization device 29 is connected to the junction of a load impedance 45 of the amplifying element 43. The input 27 which is also the input of the amplifier 43 is connected to a series arrangement of resistors 47 and 49. One end of the resistor 49 is connected to a supply voltage source not shown and is shunted by a diode 51. The combination of resistor 49 and diode 51 forms a rectifier circuit together with a capacitor 53. The said rectifier circuit is connected to the collector of a transistor 55 serving as an amplifier element which collector is connected to a supply source not shown through a load resistor 57. The transistor 55 has a base 59 which is connected to the input 41 for supplying the beam current. The base 59 is furthermore connected to the collector of a transistor 61 serving as an electronic switch. The base of transistor 61 is connected through a resistor 63 to an output 65 of the time-base device 24 for applying gating pulses to said base.

The operation of the television receiver in so far as is important for the understanding of the invention will be described hereinafter.

A signal received at the input 3 is amplified and detected by the section 1 in, for example, known manner. The video signal in this received signal is passed through the time-dependent transmission circuit of the brightness control device 9. According to the invention during at least part of the period $T_2$ of the second reference signal occurring in the video signal, the video signal in said time-dependent transmission circuit is passed on with a transmission other than during the period $T_1$ of the picture signal occurring in the said video signal. As a result in the video signal to be displayed which is obtained at the output 5 of the section 1 an amplitude ratio arises between the first reference signal derived from the second reference signal and the picture signal which is different from the amplitude ratio at the input 3 between the second reference signal and the picture signal in the received video signal. The video signal to be displayed is passed through the output 5 to the input 27 of the beam-current stabilization device 29 in which a certain extent of current control of the electron beam occurring at the input 41 is coupled to the level of the first reference signal by readjusting the cathode-wehnelt voltage of the display tube 37. The video signal to be displayed and amplified by the beam-current stabilization device 29 and provided with a control voltage is now applied through the output 31 to the input 33 of the picture display section 35 for display on the display tube 37.

The operation of the brightness control device 9 according to the invention is as follows:

The received brightness signal may be transmitted from the input 11 to the output 13 through either of the two potentiometers circuits 21 or 23 dependent on the position of the electronic switch 19. The switch 19 periodically changes position at the line-frequency with the aid of, for example, a pulse obtained in the time-base device 24 and applied to its input 18 and this, for example, in such manner that during the period $T_1$, hence during the occurrence of the picture signals, the switch 19 is in the position shown and during the period $T_2$. Therefore during the occurrence of the second reference signal, it is in the other position not shown. In the position shown the picture signal in the received video signal is passed from the input 11 through the potentiometer 21 to the output 13, and during at least part of the period $T_2$ the second reference signal is passed from the input 11 through the potentiometer 23 and the nonshown position of the switch 19 to the output. According to the invention the ratio between the attenuations of the potentiometers 21 and 23 is adjustable. To this end the potentiometer 23 is, for example, designed as an adjustable potentiometer.

The ratio between the amplitude of the first reference signal and the amplitude of the picture signal influenced in this manner determines the picture brightness because the first reference signal is coupled to partially control an electron beam of the display tube 37. The said ratio must be independent of the nature of the picture signal and hence of the picture signal contents. This is the case if according to the invention the level in the video signal corresponding to a certain brightness is independent of nature of the picture signal. In order to be able to vary the amplitude of the reference signal with the aid of the variation of transmission described hereinbefore, the level of the second reference signal at the input 11 must differ from zero according to the invention, that is to say, it must have a certain amplitude. This is, for example, the case if the back porch of the line synchronization pulse serves as a second reference signal and the video signal is maintained, for example, with the aid of a DC restorer or a clamping circuit at a level which differs from the back porch level, for example, the level of the peaks of the synchronization pulses. In a modulated signal received at the input 3 of the receiver this situation furthermore occurs, for example, at the video detector of the receiver. In the detected signal the back porch is always at a level which differs from zero and is independent of the nature of the picture signal and this in a position determined by the transmitter relative to the remainder of the video signal. The above-mentioned requirements are also satisfied in a received signal which is not yet modulated.

The video signal appearing on the output 13 and to be produced on the display tube 37 now comprises a picture signal and a first reference signal the level of which relative to other fixed levels in the video signal to be displayed is adjustable without the amplitude of the video signal received and applied to the input 11 exercising influence on the amplitude ratios of the first reference signal in the video signal to be displayed at the output 13. Because the control of the display tube 37 is coupled to the level of the first reference signal and said level increases or decreases to the same extent in case of increase or decrease of the amplitude of the received video signal, and hence the level differences in the video signal of the picture signal relative to the first reference signal increase or decrease to the same extent, a picture impression is gained which is independent of the contrast in the picture at each brightness adjustment of the picture on the display tube 37. To gain a good picture impression the brightness control of the picture need not be readjusted at each variation of the contrast control. A brightness control which is ideal in theory and also very advantageous in practice is obtained by positioning the black level in the first reference signal in the signal to be applied to the display tube 37 with the aid of the potentiometer 23 at the same level in the video signal as coupling the black level in the picture signal and the black control of the display tube 37 to the black level in the first reference signal. The so-called setup which was present in the received video signal, that is to say, the difference between the black level in the second reference signal and the black level in the picture signal can be corrected with the aid of the potentiometer 23. This correction remains unchanged for each amplitude of the received video signal and is thus, for example, independent of the contrast control. The contrast control not shown in a television receiver according to the invention may take place as viewed in the direction of the signal prior to or after the brightness control because this has no influence on the operation thereof. The brightness control with the aid of a device 9 shown in FIG. 1 will preferably take place in the video-frequency signal section and hence after demodulation in the section 1. A circuit arrangement with which this is preferably effected in the IF-part of a receiver will be described in the following embodiment. The very accurate brightness control according to the invention particularly shows to full advantage in an accurate black level stabilization on the first reference signal in the video signal at the picture display tube 37. According to a preferred embodiment of the invention the beam current of the picture display tube 37 is coupled to the first reference signal level and stabilized thereon with the aid reference the beam-current stabilization device 29 shown in the FIG. It is usual to couple a control voltage of the picture display tube to the level of a reference signal in the video signal. A certain control voltage of the picture display tube does not, however, always produce the same beam current in the picture display tube. Said current is dependent on, for example, supply voltages which may vary. For the usual brightness control with the aid of a reference signal of constant amplitude in the video signal to be displayed it would make little sense to apply a stabilization of the beam current on the reference level because a slight change in video signal amplitude would result in a comparatively large shift of the black level in the picture signal relative to that in the reference signal so that the location of a black level reference signal relative to a black level picture signal would still be disturbed. In the brightness control according to the invention a level of the first reference signal remains, however, accurately at the adjusted relative level in the video signal and a beam-current stabilization on the reference signal in combination with the brightness control according to the invention forms a particularly advantageous combination. Said combination furthermore provides the surprising possibility to obtain such a video signal at the picture display tube that the black level in the picture signal can optionally be brought below that of the reference signal. This is principally not possible for black-current stabilization with the aid of a brightness control in which the levels of the first reference signal and of the picture signal in the video signal to be displayed cannot be displaced relative to each other. In fact, in a beam current corresponding to black there must always flow a beam current in order to be able to measure and stabilize this current. Consequently if in such a system the total level, hence also that of the first reference signal, would be positioned below zero, then there would flow no beam current at all and it would not be possible to measure and stabilize.

The operation of the beam-current stabilization device 29 is as follows:

The beam current of the picture display tube 37 is led through the input 41 to the collector of the transistor 61. During the occurrence of the picture signal in the video signal the transistor is kept in a conductive condition by a current pulse in the base which pulse is obtained through a resistor 63 from the output 65 of the time-base device 24 so that no voltage is produced at the input 41. During the occurrence of the first reference signal the transistor 61 is brought in a nonconductive condition so that the beam current of the picture display tube 37 is applied to the base of the transistor 59 and appears in amplified form in the collector of said transistor. A pulse voltage is then produced across the resistor 57 the amplitude of which voltage is a measure for the beam current during the occurrence of the first reference signal. Said pulse voltage is rectified with the aid of a detection network consisting of a capacitor 53, a resistor 49 and a diode 51 and is applied as a control voltage to the grid-adjusting voltage of the tube 43 also serving as a video signal amplifier. The DC-current component of the adjusting voltage which has been produced at the said detection circuit arrangement 49, 51, 53 then appears at the anode of the tube 43 and is applied through the output 31 and the input 33 to a control electrode of the picture display tube 37. Due to the resultant closed control loop between the cathode and the wehnelt electrode of the picture display tube 37 each undesired variation of the average beam current produced by the first reference signal is opposed. The beam current is thus very accurately coupled to the first reference signal and stabilized at a certain value.

Figure 2:
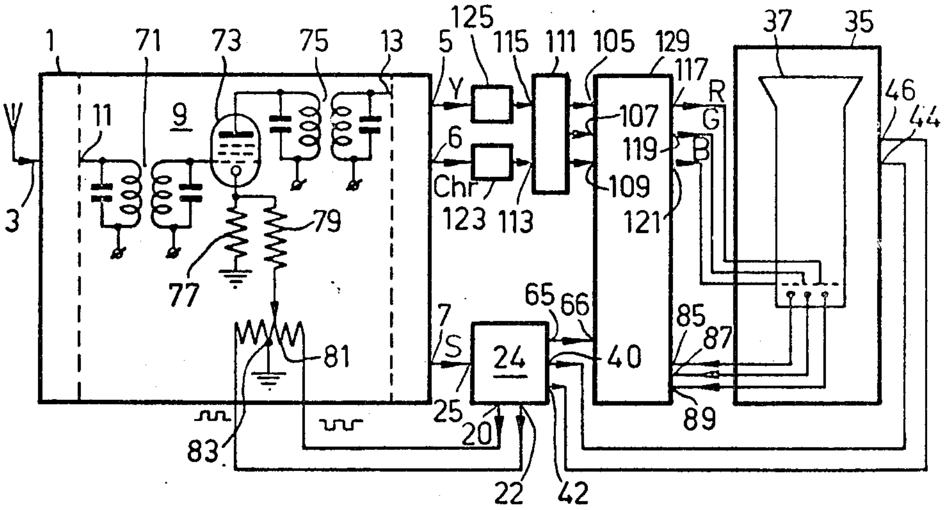
FIG. 2 shows a color television receiver according to the invention having a brightness control device in which the transmission of a transmission circuit is varied every time by varying the adjustment of an active element in the transmission circuit.

In FIG. 2, in which for the sake of clarity the portions which are not important for the understanding of the invention have been omitted and in which corresponding portions have the same reference numerals as those in FIG. 1, the color television receiver comprises a section 1 having an input 3 for applying the received color television signal to be handled which is a video signal modulated on a carrier. Such a video signal comprises a picture signal including a brightness signal Y and a color signal Chr, a synchronization signal S and a second reference signal $R_2$ (for example, the black porch before and after the line synchronization pulses). The section 1 includes, for example, means for RF and IF amplification, for demodulation of the received signal and for dividing the demodulated signal into the signals Y, Chr and S. The section 1 has three outputs 5, 6 and 7 each for applying one of these signals and further includes a brightness control device 9 having an input 11 and an output 13. The brightness control device 9 is located in a portion of the section 1 in which the received signal contains the video signal in a form modulated on a carrier, for example, in the IF-amplification section. The input 11 of the brightness control device 9 is connected through a transmission element 71, for example, an IF-transformer, to the control grid of an IF-amplifier tube 73. A transmission element 75 is located in the anode circuit of the tube 73, for example, also an IF-transformer for applying the IF-signal amplified in the tube with the video signal modulated thereon to the output 13. A resistor 77 is included in the cathode connection of the tube 73. This cathode is also connected through a resistor 79 to an adjustable tap of a potentiometer 81. The ends of the potentiometer 81 are connected to two outputs 20 and 22 of a time-base device 24 for applying thereto, for example, pulses of opposite polarity derived from the line time base. The potentiometer 81 furthermore has a tap 83 which is connected to ground. An input 25 of the time-base device 24 is connected to the output 7 of the section 1 for receiving synchronization pulses S derived from the received color television signal. The time-base device 24 furthermore has two outputs 40 and 42 which are connected to inputs 43, 45 of a picture display section 35 for supplying thereto deflection currents for deflecting the electron beams of a picture display tube 37 for the purpose of scanning the picture screen of said tube. The time-base device 24 has an output 65 for applying a gating pulse to an input 66 of the beam-current stabilization device 129. The beam-current stabilization device 129 may, for example, include three beam-current stabilization devices 29 described in FIG. 1 each forming a control loop between a wehnelt electrode and a cathode of the picture display tube 37 and which also serve as amplifiers for a color signal. The beam-current stabilization device 129 furthermore has three inputs 85, 87, 89 for supplying the beam currents to be measured and originating from the cathodes of the picture display tube 37 and three inputs 105, 107, 109 which are each connected to an output of a color demodulator and matrix circuit 111 for receiving three color signals therefrom. Three outputs 117, 119 and 121 of the beam-current stabilization device 129 are each connected to a wehnelt electrode of the color picture display tube 37 for the intensity control of each beam current with one of the color signals to be applied through the inputs 105, 107, 109, for example R, G, B, for red, green and blue control. An input 113 of the color demodulator and matrix circuit 111 is connected through a chrominance signal amplifier 123 to the output 6 of the section 1 for applying a color information signal Chr to input 113. An input 115 of the color demodulator and matrix circuit 111 is connected through a brightness signal amplifier 125 to the output 5 of the section 1 for applying a brightness signal Y thereto.

The operation of the color television receiver of FIG. 2 is as follows:

A received RF-color television signal is applied through the input 3 to the section 1. The second reference signal $R_2$ is a standard signal corresponding to a certain standard brightness level in the picture signal transmitted by the transmitter. As a rule said standard brightness level is the black level. The received RF-color television signal is amplified in, for example, known manner, transformed to an intermediate frequency, amplified in an intermediate frequency, demodulated and divided into a brightness signal Y appearing at the output 5, a chrominance signal Chr appearing at the output 6 and a synchronization signal S appearing at the output 7. The brightness control device 9 is located in the portion in which the intermediate frequency amplification takes place. An IF-color television signal supplied to the input 11 has a certain ratio between the amplitude of the second reference signal $R_2$ and the picture signal in the video signal. Said ratio may be modified as desired in the brightness control device so that a ratio between the amplitude of the reference signal which is then $R_1$ and the brightness signal in the picture signal may appear at the output 13 which ratio is different from that at the input 11. The operation of the brightness control device 9 will be explained hereinafter.

The brightness signal Y obtained at the output 5 of the section 1 is amplified in the amplifier 125 and is applied to the input 115 of the color demodulator and matrix circuit 111. The chrominance signal Chr obtained at the output 6 of the section 1 is applied to the input 113 thereof. The chrominance signal Chr supplies color difference signals after demodulation and together with the brightness signal Y these are composed to color signals R, G and B. As a result the first reference signal $R_1$ appears in each of these color signals in a certain ratio determined by the matrix circuit. The first reference signal in each of these color signals is a standard level for the saturation of colors produced with the aid of these color signals. The color signals are applied through the inputs 103, 105, 107 to the beam-current stabilization device 129 in which they are, for example, separately amplified and in which the amplifiers with which this is effected also serve, for example, as DC-voltage amplifiers for amplifying the control voltages derived from beam currents supplied through the inputs 85, 87 and 89. The color signals appearing at the outputs 117, 119, 121 of the beam-current stabilization device 129 and control voltages are applied to the wehnelt electrodes of a color display tube 37. As a result these influence the beam currents which are supplied through the inputs 85, 87, 89 to the beam-current stabilization device 129 and are measured during the occurrence of the first reference signal $R_1$ and converted into the said control voltages so that each beam current is coupled to the relevant reference level in the color signal and is stabilized thereon.

The operation of the brightness control device 9 is as follows. An IF-color television signal is applied from the input 11 through an IF-transformer 71 to the control grid of the tube 73, appears in amplified form at the anode of said tube and is given off through the IF-transformer 75 to the output 13. According to the invention the amplification of the tube 73 is time-dependent as a result of a pulse voltage which is applied through a potentiometer 79, 77 to the cathode of the tube 73. The amplitude and the polarity of this pulse voltage is adjustable by means of an adjusting potentiometer 81. A tap 83 of adjusting potentiometer 81 is maintained at zero potential, for example, in that a central tap thereof is connected to ground as is shown in the Figure. Pulse voltages originating from the outputs 20 and 22 of the time-base device 24 are applied in opposite phase to the ends of the potentiometer. The pulses occur during the time that the second reference signal $R_2$ is present in the video signal at the input 11. Both with positive and negative modulation the level of the second reference signal $R_2$ in the IF-signal differs from zero and is independent of the nature of the picture signal. Due to the time-dependent amplification of the tube 73 the second reference signal is amplified in a different manner than the picture signal. As a result the second reference signal $R_2$ appears as the first reference signal $R_1$ at the output 13 at a level relative to the picture signal which is different from the second reference signal $R_2$ relative to the picture signal at the input 11. Said level shift is dependent in magnitude and direction on the adjustment of the potentiometer 81. Since the first reference signal $R_1$ at the picture display tube 37 is coupled to a certain brightness, the picture brightness is thus adjustable by means of the potentiometer 81. In case of an amplitude variation of the signal at the input 11 the amplitude difference between the first reference signal and the picture signal at the output 13 and obtained with the aid of the control device 9 varies to the same extent. As already noted, the first reference signal $R_1$ always produces the same beam currents in the display tube as a result of the stabilization of the beam currents. In case of an amplitude variation of the video signal the background brightness in the picture produced by the picture signal varies to the same extent as the maximum brightness in said picture produced by the picture signal. Since the video signal in the device 103 influences each beam current, both the contrast and the background brightness in the picture decrease in case of, for example, a decrease of contrast in the video signal so that the saturation of the colors in the picture displayed seems to remain unchanged. Said seemingly unchanged saturation also occurs in case of an increase of contrast. If the background brightness is adjusted to a low value or to a high value with the aid of the control device 9, an impression is obtained of substantially unchanged saturation. Since the brightness control according to the invention operates very favorably also with slight picture contrast and low-adjusted picture brightness a satisfactory picture control may also be obtained in a poorly illuminated room. With such an adjustment color shifts in the picture might occur as a result of, for example, supply voltage variations in the picture display section of differences in the characteristics elaboration the the invention, guns of the picture display tube 37. The satisfactory possibility of adjusting the picture brightness shows in such a case to the fullest advantage if said color shifts cannot occur which, according to an elaboration of the invention may be achieved by using beam-current stabilization of each of the three electron beams as this has already been described hereinbefore.

In connection with the beam current stabilization a picture display section with color signal control is referred to in the embodiment of FIG. 2. It is of course alternatively possible to use the brightness control according to the invention in case of control of the picture display section with color difference signals and a brightness signal because said adjustment only affects the brightness signal. In fact, during the occurrence of the reference signal the color difference signals are not present in the video signal. As a result the brightness control according to the invention can be used in the different color television systems such as, for example, PAL, NTSC and SECAM.

Although in the foregoing no mention has been made of details of the receiver there is a slight difference in effect of the brightness control according to the invention, dependent on the manner in which an automatic gain control is effective in the IF-amplifier. If this is a control which is effective on a scanned video signal and if the scanning time coincides with the period of time that the transmission for the reference signal is switched on in the brightness control device then also a slight change in amplitude ratio between low and high levels in the picture signal will occur in case of a variation of the brightness control, whereas this is not the case if the automatic gain control is effective on a video signal which is scanned at another point of time. Both solutions may be used.

The brightness control is suitable for television signals in which positive modulation for the video signal may be used, as well as for that with negative modulation. To this end the reference signal in the brightness control device must only have a level which differs from zero and is independent of the nature of the picture signal.

Although in the foregoing generally transistors instead of valves are applicable in the various positions in the circuit arrangements, this is not the case for the transistors 59 and 61 of the current measuring device of FIG. 1, for which device a copending application Ser. No. 737,081 has been filed on June 24, 1968.

A contrast control in a television receiver according to the invention may take place prior to or after the brightness control without influencing the brightness control in the direction of movement of the signal.

It will furthermore be evident that the above-described brightness control according to the invention is not bound to the number of electron beam currents to be controlled in the picture display tube. Even beam-current stabilization is not strictly necessary; a brightness control according to the invention may also be used with, for example, conventional clamping circuits which clamp, for example, at the reference level.

It is furthermore possible to use, for example, a voltage-dependent attenuation member, for example, a semiconducting element as a transmission circuit with a time-dependent transmission in the brightness control device.

Figure 3:
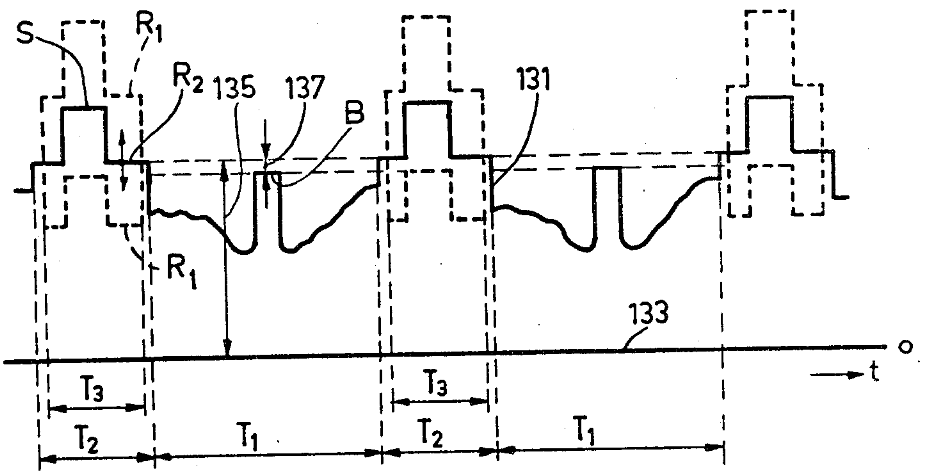
FIG. 3 shows with reference to an amplitude time-diagram a video signal comprising a picture signal and a reference signal.

In the foregoing reference has been made to a reference signal which is present in the received signal. It is possible to use the brightness control according to the invention on a received signal in which a reference signal is applied to the receiver. The advantages of said brightness control then only occur if the applied reference signal is in a fixed amplitude ratio to other fixed levels in the received signal. FIG. 3 shows the amplitude of a received video signal 131 as a function of time at the input of a brightness control device according to the invention. The video signal 131 contains a picture signal during the periods $T_1$ which provides a picture on the picture display tube of the television receiver and the reference signals $R_2$ referred to in this respect as second reference signals, such as, for example, a black porch signal during the periods $T_2$. The video signal 131 further includes a synchronization signal S which occurs during the periods $T_2$ and can possibly also serve as a second reference signal. The brightness control device according to the invention shows every time during at least part of the period $T_2$, for example, a period $T_3$, a transmission which is adjustable relative to that during the period $T_1$ of the occurrence of the picture signal. The zero level is indicated by the line 133. The second reference signal has an amplitude 135 which is independent of the nature of the picture signal and which differs from zero. The so-called setup in a received signal is indicated by 137, that is to say, the difference in amplitude between the black level in the reference signal $R_2$ and the black level B in the picture signal. The signal transmitted during the period $T_3$ at the output of the brightness control device is shown in a broken line and is called the first reference signal $R_1$. Dependent on the position of the brightness control according to the invention this may be enlarged or reduced in amplitude proportional to the picture signal. For example, the first reference signal $R_1$ at the picture display tube is coupled to a certain extent of control of an electron beam so that by adjusting the amplitude ratio between the picture signal and the first reference signal $R_1$ the brightness of the picture displayed is adjustable. As has been referred to in the forgoing a possible amplitude variation of the video signal 131 at the input of the brightness control device according to the invention does not influence the picture impression gained. In FIG. 3 this only means a variation of scale in the direction transversely to the zero level line 133. All levels in the input and the output signals of the brightness control device then vary to the same extent, that is to say, in unchanged mutual ratio. In a color television signal materially the same picture occurs as is shown in FIG. 3 in which a few high frequency color information signals are superimposed on the signal 131 which does not make any difference for the operation of the brightness control device according to the invention.

What I claim is:

1. A circuit for controlling a display tube by a television signal having brightness, synchronization, and nonzero reference signal components, said circuit comprising a time dependent transmission circuit having a signal input means coupled to receive said television signal and an output means for supplying an output television signal; means for coupling the output reference signal to control the output of the display tube; and means for controlling the ratio of the reference signal component to the brightness signal component of the output television signal including time dependent means for controlling the transmission of said transmission circuit; thereby to supply to said display tube reference signal components of different relative values.

2. A circuit as claimed in claim 1 wherein said transmission the comprises an The element and said transmission controlling means comprises means for varying the amplification of said element.

3. A circuit as claimed in claim 2 wherein said active element comprises an intermediate frequency amplifier and said transmission circuit controlling means comprises a source of amplitude adjustable pulses.

4. A circuit as claimed in claim 1 wherein said coupling means comprises means for keeping constant the beam current of said display tube in accordance with said output reference signal.

PO-1050
(5/69)

UNITED STATES PATENT OFFICE

CERTIFICATE OF CORRECTION

Patent No. 3,598,913 Dated August 10, 1971

Inventor(s) PETER JOHANNES HUBERTUS JANSSEN

It is certified that error appears in the above-identified patent and that said Letters Patent are hereby corrected as shown below:

In the claims, col. 10, line 56, cancel "The" and insert

-- active --;

Signed and sealed this 21st day November 1972.

(SEAL)
Attest:

EDWARD M.FLETCHER,JR.
Attesting Officer

ROBERT GOTTSCHALK
Commissioner of Patents